(12) United States Patent
Reed et al.

(10) Patent No.: US 7,383,933 B2
(45) Date of Patent: Jun. 10, 2008

(54) HYBRID ELECTRO-MECHANICAL TRANSMISSION WITH SECURED HUB FOR PARK PAWL LOADING AND METHOD

(75) Inventors: William S. Reed, Greenfield, IN (US); James A. Raszkowski, Indianapolis, IN (US); Joel E. Mowatt, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 256 days.

(21) Appl. No.: 11/060,217

(22) Filed: Feb. 17, 2005

(65) Prior Publication Data

US 2005/0205386 A1    Sep. 22, 2005

Related U.S. Application Data

(60) Provisional application No. 60/555,141, filed on Mar. 22, 2004.

(51) Int. Cl.
    *B60T 1/06* (2006.01)
(52) U.S. Cl. .................. 192/219.5; 74/606 R; 29/525
(58) Field of Classification Search .............. 192/219.5
    See application file for complete search history.

(56) References Cited

U.S. PATENT DOCUMENTS

| 3,386,532 | A  | * | 6/1968  | Moss ........................ 188/31 |
| 6,692,394 | B2 | * | 2/2004  | Takenaka ...................... 475/5 |
| 2005/0205383 | A1 | * | 9/2005  | Reed et al. .............. 192/219.5 |
| 2005/0205384 | A1 | * | 9/2005  | Reed et al. .............. 192/219.5 |
| 2005/0205385 | A1 | * | 9/2005  | Reed et al. .............. 192/219.5 |
| 2005/0236251 | A1 | * | 10/2005 | Yamamoto ............... 192/219.4 |

* cited by examiner

*Primary Examiner*—Richard M Lorence

(57) ABSTRACT

This invention relates to grounding the mechanical loads of an electrically variable transmission with a park pawl system located in the end cover portion of the transmission housing. The end cover portion is configured to cover the park pawl system and engagement gear. A support hub is interfittable with the end cover portion of the transmission and sufficiently secured thereto so as to ground the park pawl loads. The hub also functions to guide oil to the cavity of a piston-clutch assembly. A method of securing a hub to an electrically variable transmission housing is also provided.

15 Claims, 3 Drawing Sheets

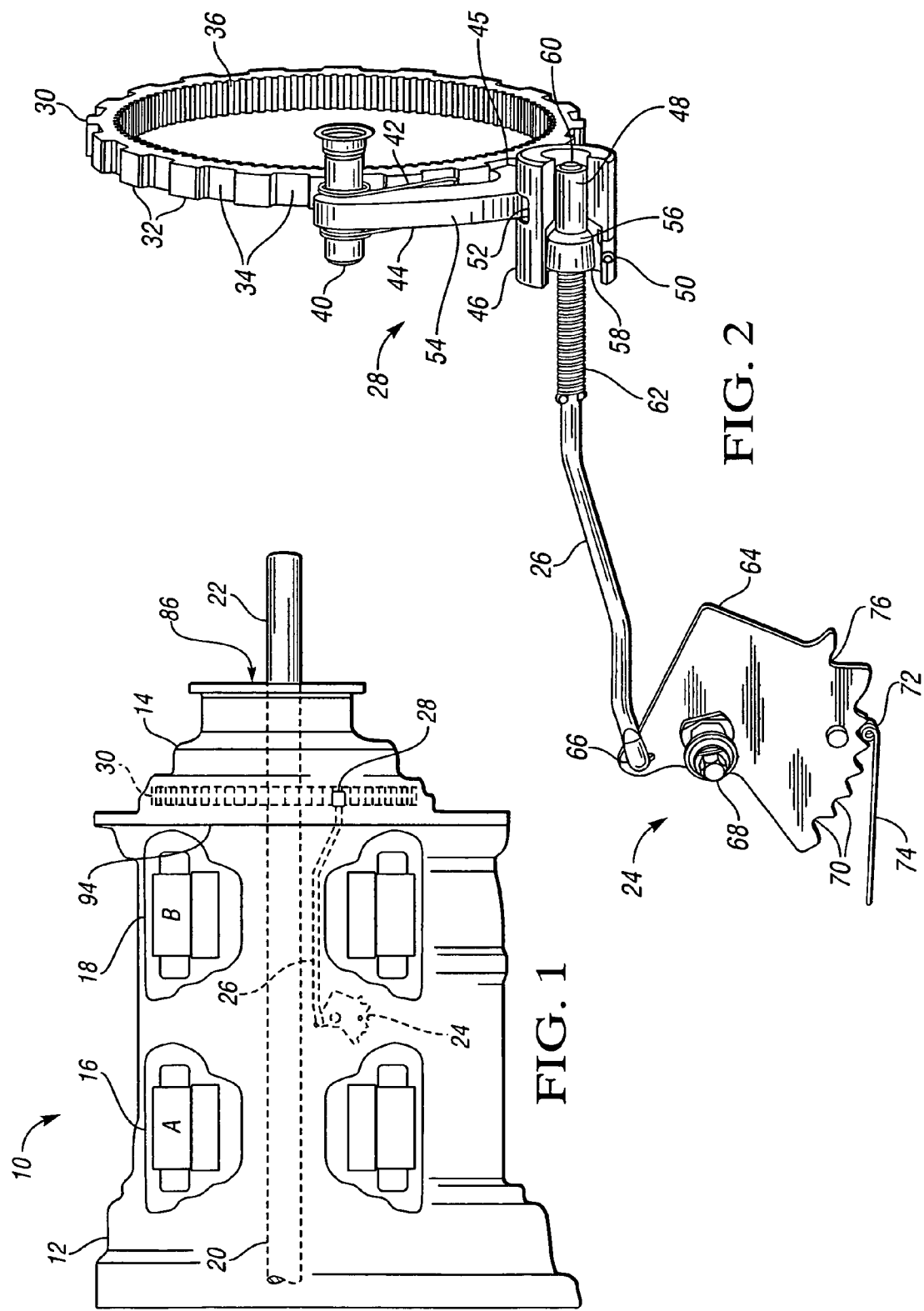

HYBRID ELECTRO-MECHANICAL TRANSMISSION WITH SECURED HUB FOR PARK PAWL LOADING AND METHOD

CROSS-REFERENCE TO RELATED APPLICATIONS

This application claims the benefit of U.S. Provisional Application 60/555,141 filed Mar. 22, 2004, which is hereby incorporated by reference in its entirety.

TECHNICAL FIELD

This invention relates to an electrically variable transmission having an end cover portion with a hub sufficiently secured to the end cover portion to withstand torsional loading from a rear mounted park pawl system.

BACKGROUND OF THE INVENTION

Vehicle transmissions, specifically planetary gear automatic power transmissions, typically have a park brake mechanism to resist the vehicle's natural tendency to roll down a sloped surface when the vehicle is in park. The contents of such a park brake generally include some sort of engagement gear that is fixed with respect to the output shaft of the transmission and a pawl designed to selectively engage with the engagement gear when the park brake is activated. The pawl substantially prevents the output shaft and attached engagement gear from rotating when the pawl engages with the recesses between the engagement gear teeth.

Vehicles with complex non-traditional powertrains, like electro-mechanical vehicles, still require a park brake mechanism. However, the alteration of some components of the transmission may require the park pawl and its harmonizing components to be altered as well. For example, some hybrid electro-mechanical transmissions require the use of two electric motors to supply power to the output shaft of the transmission.

SUMMARY OF THE INVENTION

Electrically variable transmissions with two motors have significantly limited packaging space for other transmission components. In the present invention, the park pawl and engagement gear are placed farther rearward to accommodate the second electric motor. The end cover portion of the transmission housing and hub supporting the engagement gear must be able to withstand the additional torque loading resulting from the park pawl system as the pawl restrains the pawl engagement gear.

Therefore, the present invention provides a vehicle with a park pawl and electrically variable transmission. The transmission includes an end cover portion housing a rotatable clutch housing attached to an engagement gear and supported by a hub. The hub is sufficiently secured to the end cover portion so as to support the radial loading of the engagement gear when engaged with the park pawl.

In one aspect of the present invention, the hub defines a feed sleeve, which guides oil to a piston cavity in the clutch housing.

In another aspect of the present invention, the hub is press-fittable to the end cover portion.

More specifically, the present invention relates to an electrically variable transmission (EVT) having a park pawl. The electro-mechanical transmission includes a housing having an end cover portion. A clutch housing housed in the end cover portion and relatively rotatable with respect to the end cover portion is also included along with an engagement gear rotatable with the clutch housing and radially loadable with the clutch housing when engaged by the park pawl. Furthermore, a hub is provided which is in the end cover portion and supports the radial loading of the engagement gear. The hub is sufficiently interfittable with respect to the end cover portion so as to withstand radial loading on the hub and the end cover portion resulting from the engagement between the engagement gear and the park pawl.

Another aspect of this invention includes a method of structurally securing a hub to an electro-mechanical transmission housing with an aft mounted park pawl system being at least partially housed in an end cover portion of the transmission housing. The method includes: providing a pawl engagement gear engageable with the park pawl system and at least partially housed in the end cover portion of the transmission housing; and providing a hub housed in the end cover portion of the transmission housing. The hub is sufficiently mounted with respect to the end cover portion so as to withstand loading on the hub and the end cover portion resulting from the engagement between the pawl engagement gear and the park pawl system.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic side elevational view, partly in phantom, of an electrically variable transmission housing with end cover portion and engagement gear, park pawl system and shift selector and broken away to show the electrical motors in their respective housings;

FIG. 2 is a schematic perspective view of the park pawl system and engagement gear isolated from the transmission housing;

DESCRIPTION OF THE PREFERRED EMBODIMENTS

Figure 3:
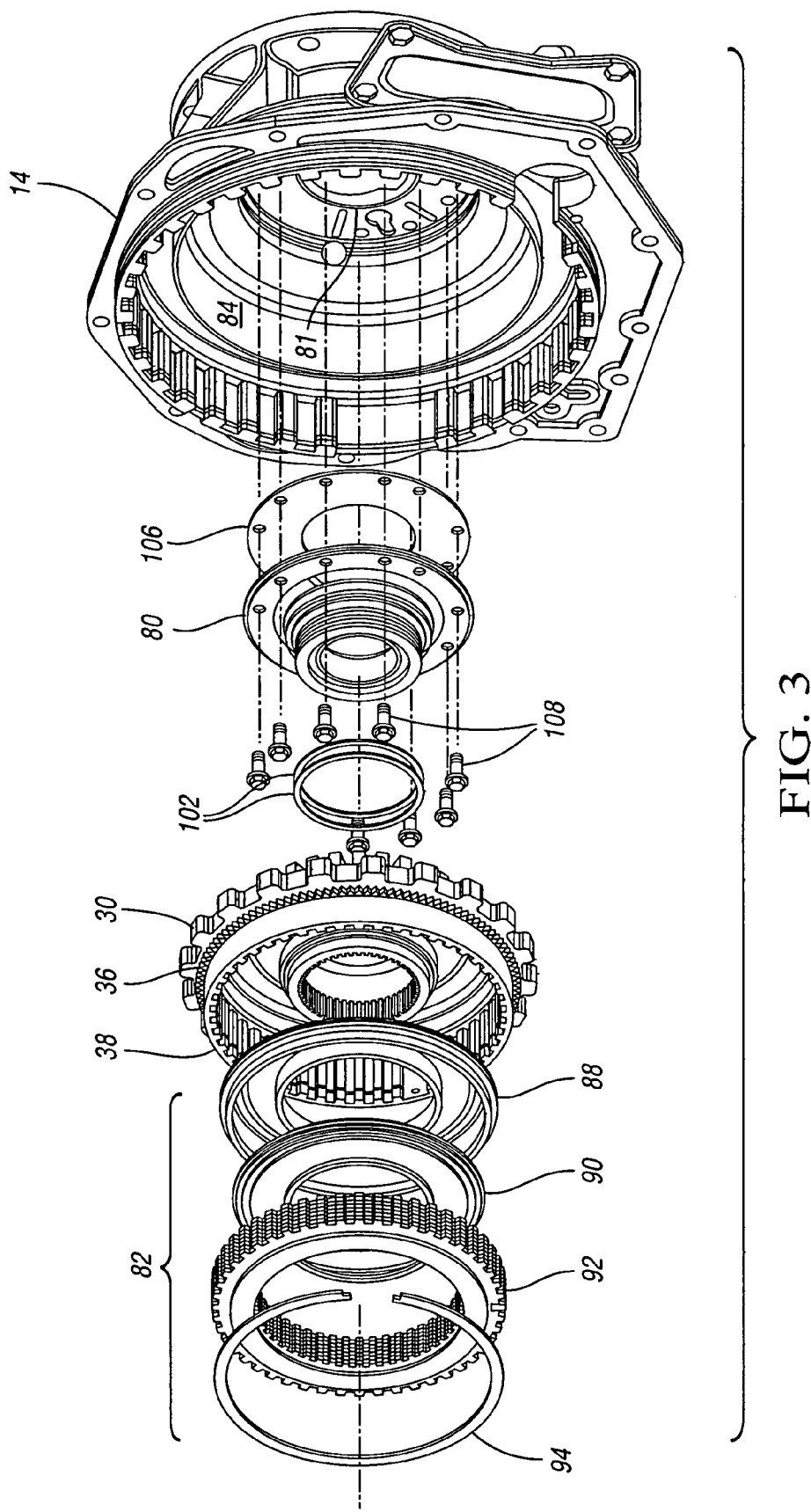
FIG. 3 is a schematic exploded perspective view of the end cover portion, hub, clutch housing, engagement gear and other cooperating transmission components.
Figure 4:
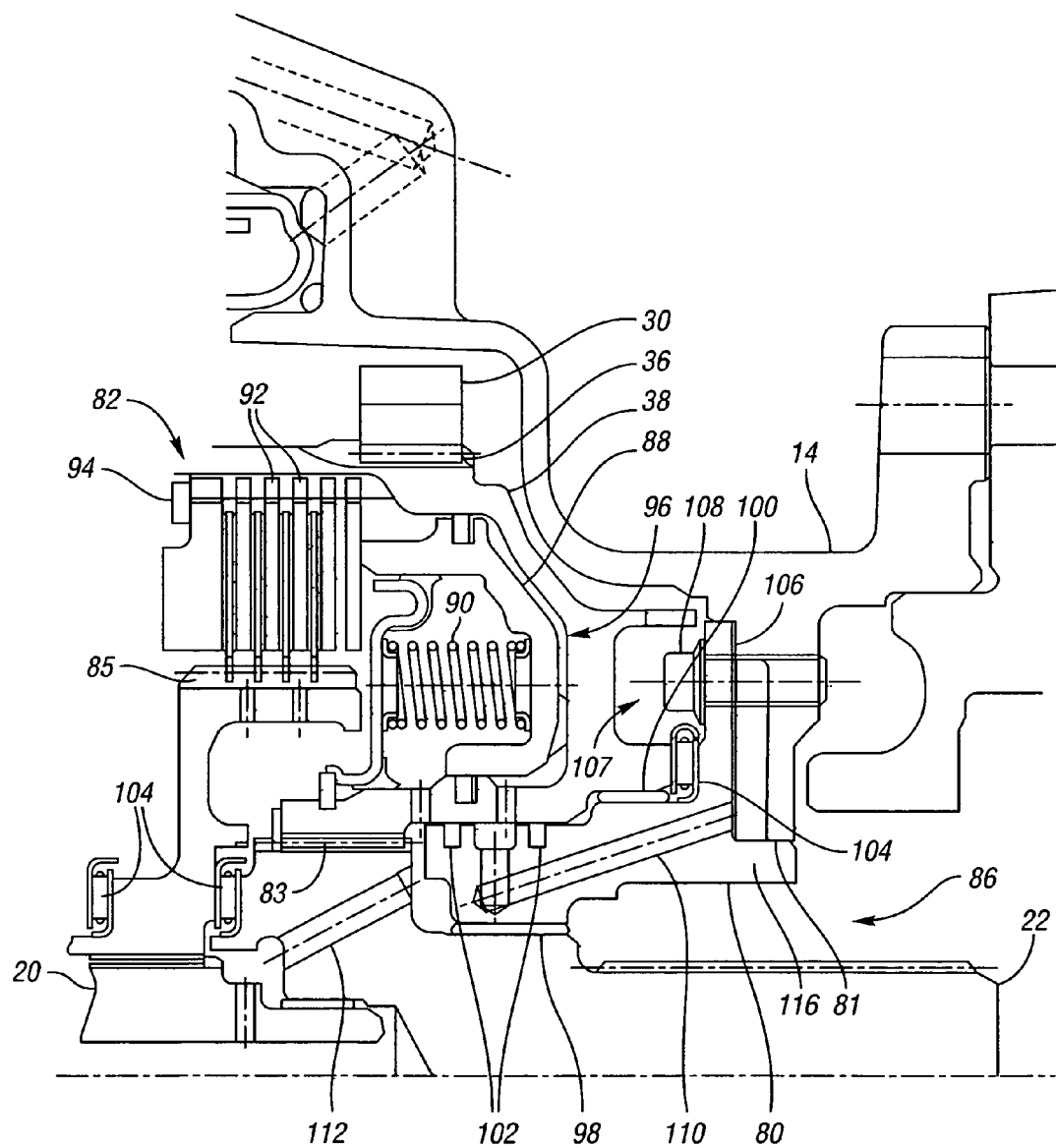
FIG. 4 is a cross-sectional view through the center of the upper half of the assembled end cover portion, hub, clutch housing, engagement gear and other cooperating transmission components.

Referring to the drawings, FIGS. 1 through 4, wherein like characters represent the same or corresponding parts throughout the several views, there is shown in FIG. 1 a schematic side elevational view of an electrically variable transmission 10. Fundamentally, a connecting rod 26 between a shift selector 24 and the park pawl engagement system 28 passes through the transmission main housing 12 to an end cover portion 14. In FIG. 2 the pawl 44, which is in mechanical communication with the connecting rod 26, of the park pawl system 28 selectively restrains the engagement gear 30, thereby loading the engagement gear 30 and clutch housing 38, which is attached thereto (as shown in FIGS. 3 and 4). Supporting the clutch housing 38 is the hub 80, which is secured to the end cover portion 14. The hub 80 and end cover portion 14 must be securely attached to ground the loads resulting from the engagement between the pawl 44 and engagement gear 30.

More specifically, the transmission consists of a two-part housing: the main housing 12 and the end cover portion 14. The main housing 12 contains two electric motors (A and B), which have their respective housings (or modules) 16 and 18. Motors A and B are journaled onto the main shaft 20 of the transmission, which is selectively linked to the output shaft 22 of the transmission. The motors (A, B) operate to selectively engage with clutches (not shown) to rotate the main shaft 20 at variable speeds and indirectly rotate the output shaft 22. The available packaging space in the main housing 12 of the transmission 10 is dominated by the housings 16 and 18 for the electric motors A and B, respectively (as shown in FIG. 1). One technical advantage of the present invention is that it enables the main housing 12 to accommodate both electric motors (A and B) by rearranging the position of other transmission components, namely the park pawl system 28. Located between and encircled by the pair of motors is a shift selector 24 that is connected (either mechanically or electrically) to the transmission gear shifter (not shown) and to a mechanical link (or connecting rod 26) that controls the park pawl system 28. The park pawl system 28 is encased by the end cover portion 14 of the transmission housing and functions to selectively interact with an engagement gear 30, which is secured to rotate with the output shaft 22.

FIG. 2 details the interaction between the engagement gear 30, park pawl system 28 and the shift selector 24. The engagement gear 30 has a number of teeth 32 and tooth recesses 34 on its perimeter. Located on the inner diameter of the engagement gear 30 are a series of complementary splines 36 functioning to secure the engagement gear 30 directly onto the clutch housing 38 (as shown in FIGS. 3 and 4) and indirectly onto the output shaft 22 (shown in FIGS. 1 and 4). When the wheels of the vehicle rotate by external forces, such as gravity, the drive shaft also turns and causes the output shaft 22 and engagement gear 30 (rotatable with the clutch housing 38) to rotate as the engagement gear 30 is configured to rotate with the output shaft 22.

With reference to FIG. 2, the park pawl system 28 consists of a pawl pin 40, torsion spring (or pawl return spring 42), pawl 44 and actuator guide 46. The pawl 44, actuator 48, and actuator guide 46 are placed in the end cover portion 14, situated to axially align the pawl 44 with the pawl engagement gear 30. The pawl 44 is configured to fit in the tooth recesses 34 on the engagement gear 30 perimeter upon activation of the park pawl system 28 (as shown at 45), thereby radially loading the engagement gear 30. The pawl 44 is mounted on the pawl pin 40, and is free to rotate or pivot about the pawl pin 40. A pawl return spring 42 operates to hold the pawl 44 in the disengaged position except when mechanically engaged. The pawl 44 is mounted adjacent to a slotted actuator guide 46 and actuator 48 so that upon transverse motion of the actuator 48 the pawl 44 is rotated or pivoted between the engaged and disengaged positions.

The actuator guide 46 encases the actuator 48 and is secured by a lock pin 50. The actuator guide 46 has a slot 52 on its perimeter, adjacent the back 54 of the pawl 44, which is configured to guide and support the pivotal movement of the pawl 44. Movement of the actuator 48 aft causes the cam portion 56 and wide portion 58 of the actuator to collide with the back 54 of the pawl 44 and force the pawl 44 to rotate or pivot into engagement with a recess 34 in the engagement gear 30. Movement of the actuator 48 forward with respect to the pawl 44 moves the cam portion 56 away from the back 54 of the pawl 44 to remove the force of the cam, whereby to release the pawl 44 from the tooth recess 34. When the pawl 44 is released from the tooth recesses 34, the pawl return spring 42 rotates the pawl 44 into the disengaged position allowing the engagement gear 30 to freely rotate.

The actuator 48 is spring mounted to an end portion 60 of the connecting rod 26. The axially positioned linear spring (or actuator return spring 62) functions to enable shift selection of park regardless of the position of pawl 44 relative to the engagement gear 30, teeth 32 and tooth recesses 34. If an engagement gear tooth 32 is located over or adjacent to the pawl 44 when park is selected, the pawl will not engage in a recess 34, but the end 60 of the connecting rod will continue to move with respect to the actuator 48 against the bias of spring 62, and the end 60 of the connecting rod 26 will extend slightly beyond the end of the actuator 48. The actuator return spring 62 enables selection of park by maintaining an axial force or bias on the actuator 48 until the engagement gear 30 rotates to a point where the gear tooth 32 is no longer adjacent to the pawl 44. With the continued bias of actuator return spring 62, the pawl 44 will then engage with a tooth recess 34 at the first opportunity (usually when the vehicle starts or continues to roll). The end 60 of the connecting rod 26, which functions as a mechanical link between the shift selector 24 and the actuator 48 then moves again with respect to the actuator 48 as the pawl 44 engages the tooth recess 34.

With reference to FIGS. 1 and 2 the connecting rod 26 is secured to the detent lever 64 of the shift selector at 66. The detent lever 64 is pivotably secured with respect to the main housing 12 of the transmission at 68, where the selector shaft lever (not shown) is also connected. The perimeter of the detent lever 64 has detents 70 on its lower end. The detents 70 are configured to engage with the cylindrical end 72 of a detent retention spring 74. The detent retention spring 74 is indirectly mounted with respect to the main housing 12 of the transmission so that upon placing the vehicle in park the selector shaft lever rotates the detent lever 64 and the cylindrical end 72 of the detent retention spring 74 engages with the most aft detent 70 of the detent lever 64 to secure it in place. To reach this position the detent lever 64 rotates clockwise, or rearward with respect to the main housing 12 moving the connecting rod 26 rearward or toward the end cover portion 14 of the transmission housing 10.

The end cover portion 14 and hub 80 must be configured to ground the torsional loads, driveline loads, clutch piston loads, and more particularly the park pawl loads of a 7800 lb vehicle. The end cover portion 14 of the transmission housing, as shown in FIGS. 3 and 4, is designed to encase the hub 80, engagement gear 30, clutch housing 38 and piston-clutch assembly 82. The end cover portion 14 is attachable to the main housing 12 as shown in FIG. 1. The end cover portion 14 defines a cavity 84 (as shown in FIG. 3) hollowed large enough to encase the engagement gear 30 and allow it to freely rotate. The end cover portion 14 contains an aperture 86 (shown in FIGS. 1 and 4) to allow for the output shaft 22 to extend out of the end cover portion 14.

Splined to the engagement gear 30 is the clutch housing 38, which is also drivably connected by splines 83 to the output shaft 22 (shown in FIGS. 3 and 4) of the transmission. The clutch housing 38 is housed in the end cover portion 14 and is relatively rotatable with respect to the end cover portion 14. A piston-clutch assembly 82 is housed inside the clutch housing 38. The piston-clutch assembly 82 includes a hydraulic piston 88 nested in the clutch housing 38 and piston return springs 90 which rest between the hydraulic piston 88 and clutch plates 92 with retaining ring 94. As the piston cavity 96 is filled with pressurized oil the piston 88 forces the clutch plates 92 to engage thereby indirectly linking the main shaft 20 to the output shaft 22 of the transmission. Therefore, the clutch housing 38, which is splined at 83 onto the output shaft 22 may influence the output shaft 22 in two ways: (i) by restricting the output shaft 22 from rotating as when the park pawl 44, shown in FIG. 2, is engaged with the engagement gear 30 (as detailed above); or (ii) by being mechanically linked to the main shaft 20 by was of splines 85 as when the clutch plates 92 are engaged, as shown in FIG. 4. In either case, the hub 80 transfers and grounds the resulting radial loading in the end cover portion 14 of the transmission housing.

The hub 80 is journaled onto the output shaft 22 between the clutch housing 38 and the output shaft 22. Bushings 98 and 100 rest between the output shaft 22 and the hub 80 as well as between the hub 80 and clutch housing 38 respectively to provide additional radial support and control oil flow within the end cover portion 14. Seal rings 102 also line the connection between the hub 80 and the clutch housing 38. Several thrust bearings 104 are also included in the assembly to assist in grounding the axial loads. A feed hub gasket 106 is also provided between the hub 80 and the end cover portion 14; it functions to confine clutch feed oil within the clutch feed 107 as the oil moves between common apertures in the end cover portion 14 and the hub 80.

In the preferred embodiment, the hub 80 is press-fit at 81 to the end cover portion 14. Structural connectors (i.e., bolts) 108, as shown in FIG. 3, are provided only to seal the connection between the end cover portion 14 and clutch feed sleeve 110 for oil travel at the feed hub gasket 106. Alternatively connecting the hub 80 with the end cover portion 14 exclusively though bolts to carry the radial park pawl load would require an inordinately sized bolt pattern and/or a four-fold increase in the number of bolts at this joint. Therefore, the preferred embodiment reduces the number of parts and simplifies the manufacturing steps required for each transmission by press-fitting the hub 80 to the end cover portion 14. Thus, the hub 80 is configured at 81, so that radial loads from the park pawl system 28 are carried from the rotating clutch housing 38 to the transmission end cover portion 14 through bushing 100. Hub 80 has a press fittable portion 116 which also has the function of supplying clutch feed oil to the clutch piston cavity 96. Alternatively, the hub 80 and the end cover portion 14 can be jointly cast as a unitary structure, however, this may require each to have the same material composition. In the preferred embodiment, the hub 80 is composed of gray iron, which provides excellent journal properties, while the end cover portion 14 is composed lightweight die cast aluminum.

The hub 80 also facilitates oil travel to the clutch housing 38 and piston cavity 96. The hub 80 defines a feed sleeve 110 operative to guide oil from the end cover portion 14, to the clutch housing 38 and into the piston cavity 96. Preferably, the feed sleeve 110 is drilled into the hub 80. It can also be cast into the hub 80. To centrifugally balance the rotating piston 88, oil travels through an aperture 112 in the output shaft 22 to the front side of the piston 88.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission having a park pawl, comprising:
    a transmission housing having an end cover operatively attached to a main housing portion;
    a clutch housing at least partially housed in said end cover and relatively rotatable with respect to said end cover;
    an engagement gear rotatable with said clutch housing and radially loadable with said clutch housing when engaged with said park pawl; and
    a hub housed in said end cover and configured to support the radial loading of said engagement gear; wherein said hub is sufficiently securable with respect to said end cover so as to withstand radial loading on said hub and said end cover resulting from the engagement between said engagement gear and said park pawl.

2. The electrically variable transmission of claim 1, wherein said hub defines a feed sleeve operative to guide oil to said clutch housing; wherein said clutch housing defines a piston cavity and said feed sleeve guides oil to said piston cavity.

3. The electrically variable transmission of claim 1, wherein said hub is securable to said end cover of said transmission housing via a plurality of structural connectors extending between said end cover and said hub.

4. The electrically variable transmission of claim 3, wherein said hub is securable to said end cover of said transmission housing via no more than eight of said structural connectors.

5. The electrically variable transmission of claim 4, wherein said structural connectors consist of bolts.

6. The electrically variable transmission of claim 1, wherein said hub is secured to said end cover via one of jointly casting said hub and end cover as a unitary structure and press-fitting said hub to said end cover.

7. The electrically variable transmission of claim 1, wherein the radial loading of said engagement gear is carried through said clutch housing and said hub via a plurality of bushings to said end cover of said transmission housing via a hub press fit portion.

8. An electro-mechanical transmission including a transmission housing having a main housing portion, comprising:
    an actuable park pawl system;
    an end cover operatively attached to the main housing portion of the transmission housing; wherein said park pawl system is at least partially located in said end cover;
    an engagement gear engageable with said park pawl system and housed in said end cover; and
    a hub housed in said end cover;
    wherein said hub is configured to be press-fittable to said end cover so that said end cover cooperates with said hub to withstand radial loading resulting from the engagement between said engagement gear and said park pawl system.

9. The electro-mechanical transmission of claim 8, further comprising:
    a clutch housing, wherein said hub defines a feed sleeve operative to guide oil to said clutch housing; wherein said clutch housing defines a piston cavity and said feed sleeve guides oil to said piston cavity.

10. The electro-mechanical transmission of claim 9, wherein the radial loading resulting from the engagement between said engagement gear and said park pawl system is carried through said clutch housing and said hub via a plurality of bushings to said end cover of the transmission housing via a hub press fit portion.

11. The electro-mechanical transmission of claim 10, wherein said hub is securable to said end cover of the transmission housing via a plurality of structural connectors extending between said end cover and said hub.

12. The electro-mechanical transmission of claim 11, wherein said hub is securable to said end cover of the transmission housing via no more than eight of said structural connectors.

13. The electro-mechanical transmission of claim 12, wherein said structural connectors consist of bolts.

14. A method of structurally securing a hub to an electro-mechanical transmission housing; wherein the transmission includes an aft mounted park pawl system at least partially housed in an end cover operatively attached to a main housing portion of the transmission housing, comprising:

providing a pawl engagement gear engageable with said park pawl system and at least partially housed in the end cover of the transmission housing; and providing a hub at least partially housed in said end cover of said transmission housing; wherein said hub is press fit with respect to said end cover so as to withstand loading on said hub and said end cover resulting from the engagement between said pawl engagement gear and said park pawl system.

15. The method of claim 14, further comprising:

extending structural connectors between said end cover and said hub to attach said hub to said end cover.

* * * * *